W. A. GORDON

Aug. 28, 1928. MACHINE FOR MANIPULATING PLASTIC MATERIALS Re. 17,070

Original Filed Aug. 18, 1925

INVENTOR

William A. Gordon by

Harry R. Williams

Atty.

Reissued Aug. 28, 1928.

Re. 17,070

UNITED STATES PATENT OFFICE.

WILLIAM A. GORDON, OF SHELTON, CONNECTICUT, ASSIGNOR TO FARREL-BIRMINGHAM COMPANY, INCORPORATED, OF ANSONIA, CONNECTICUT, A CORPORATION OF CONNECTICUT.

MACHINE FOR MANIPULATING PLASTIC MATERIALS.

Original No. 1,608,980, dated November 30, 1926, Serial No. 51,001, filed August 18, 1925. Application for reissue filed March 19, 1928. Serial No. 262,860.

This invention relates to those machines for manipulating plastic materials which are particularly applicable for working rubber stock. It is common practice in rubber mills to masticate and mix rubber and the substances compounded therewith and then store it for the purpose of establishing suitably aged stock that can be drawn upon as required for the calendering rooms, press rooms, tube machine rooms and other places where the mixed stock is further manipulated. Rubber thus stored becomes cold and much harder and stiffer than when it leaves the mixing machines and it is customary to warm up and remasticate this rubber before delivering it to the calenders, presses, tube machines or other machines for further working.

The object of this invention is to provide a machine for performing the warming up operation on plastic materials, which machine will be relatively inexpensive to build, will be powerful yet occupy a comparatively small space in the mill, and can be continuously and efficiently operated by ordinary labor and caused to produce a large output of stock in desired condition for further manipulation by calenders, presses, tube machines and the like.

This end is accomplished in the preferred form of the invention by providing a suitably heavy housing containing a powerful rotatable worm which will crush off the stock that is fed from a hopper into the machine and feed it forward, at the same time working and compressing it and thus generating some heat, and deliver the warmed and partially masticated stock to a chamber in which it is kneaded and there further worked and heated. From this chamber the suitably heated mass preferably passes into a collecting cavity and thence is extruded preferably through a die having an opening or openings of a shape depending upon the future use of the stock. The housing covering the worm and containing the kneading chamber and collecting cavity and carrying the die, is adjustable axially with relation to the worm, whereby the quantity of material passing through the machine and the amount of work done upon the material before it passes out through the die can be accurately regulated.

Figure 1:
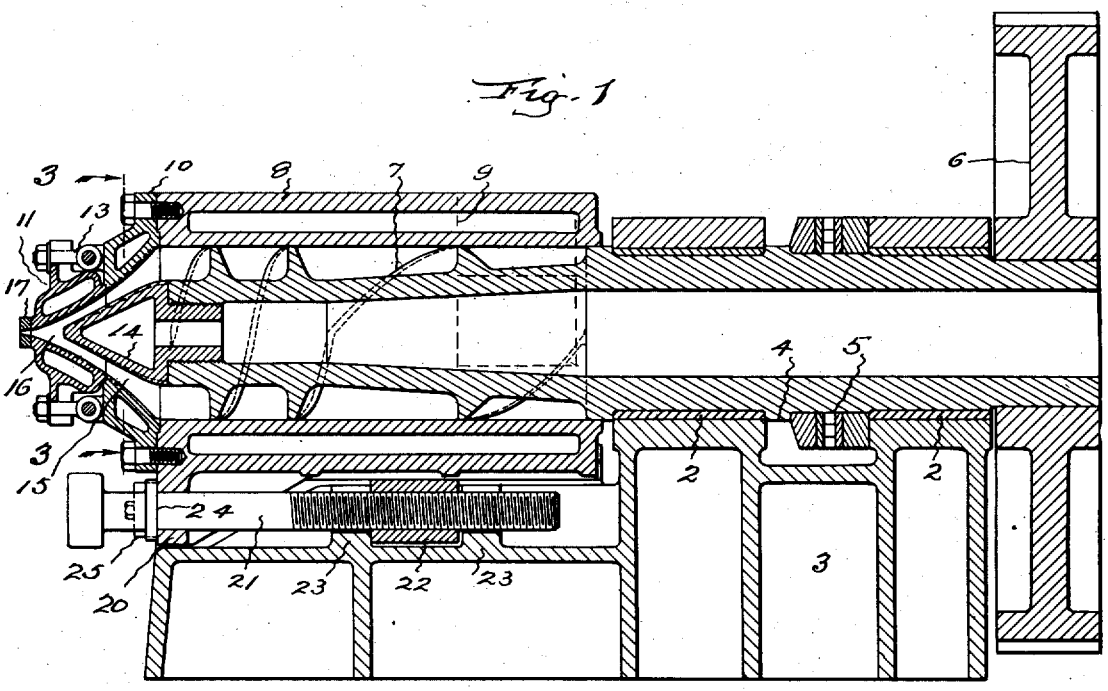
Figure 2:
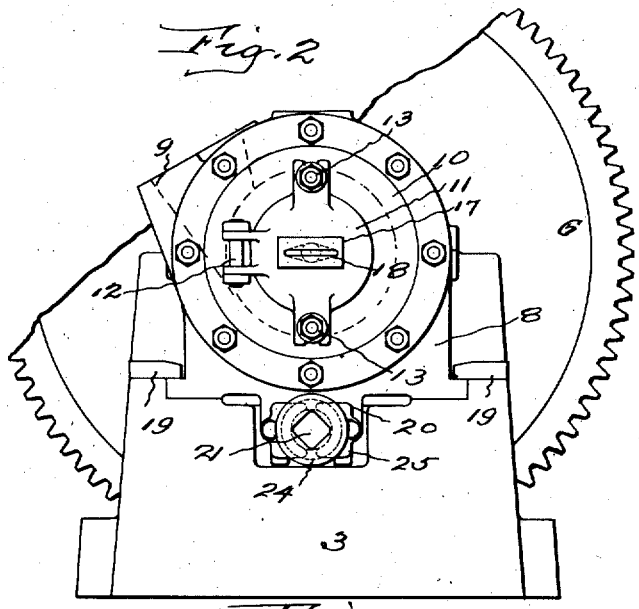
Figure 3:
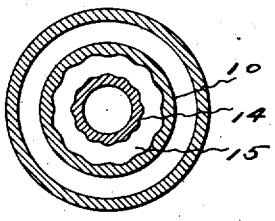
Figure 4:
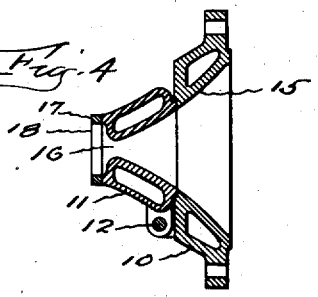
Figure 5:
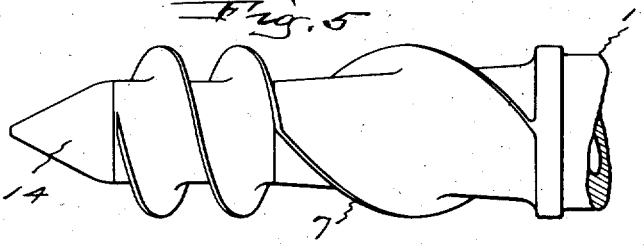

In the accompanying drawings Fig. 1 shows a longitudinal vertical section of a machine which embodies the invention. Fig. 2 shows an elevation of the delivery end of the machine. Fig. 3 shows a transverse section of the delivery end on the plane indicated by the dotted line 3—3 on Fig. 1. Fig. 4 is a horizontal section of the head that is applied to the delivery end of the casing. Fig. 5 is a view of the worm.

In the form of machine illustrated the shaft 1 is mounted in radial bearing bushings 2 supported by the bed 3. Between a collar 4 on the shaft and one of the bearings is a roller thrust bearing 5. The shaft is hollow and on one end is a driving gear 6 and at the other end is a worm 7 of large diameter and volumetric capacity. Enclosing the worm and slidably mounted on the bed axially of the worm is a water jacketed housing 8 provided with means as at 9 for the attachment of a feed hopper which will open to the interior of the housing near one of the main shaft bearings. The pitch of the worm becomes much steeper and its volumetric capacity considerably reduced from the hopper opening to the discharge end of the housing, and the interior diameter of the housing is substantially the same as the diameter of the worm threads.

Rubber fed into the casing is crushed off from the main piece or pieces and is pushed forward by the thread of the worm when the shaft is rotated, and collected into a compacted mass at the delivery end of the worm. This results in heavy pressure on the rubber at the far end of the worm, with a consequent development of heat which keeps the mass plastic.

At the forward end of the housing is a water jacketed head. This head is desirably formed in two parts, the section 10 that is bolted to the housing, and the section 11 that is hinged thereto by pin 12 and is clamped in place by swivel bolts 13. The opening in the head which in the main is conical, at the larger end is the same diameter as the interior diameter of the housing. The wall of the opening in the head is fluted or provided with round corrugations which grow less in width and depth as they approach the smaller end of the opening.

Attached to the end of the shaft at the forward end of the worm is a conical tip 14 the base of which has a diameter substantially the same as the diameter of the root of the worm threads at the end of the shaft. This tip is fluted or provided with rounded corrugations which grow less in width and depth as they approach the truncated apex of the cone, similar to the inner wall of the head. A tapering annular kneading chamber 15 is thus formed between the inner corrugated wall of the head and the outer corrugated surface of the tip. Beyond this kneading chamber is a small collecting cavity 16. Covering the opening from the collecting cavity is a steel or other metal plate or die 17 with one or more orifices 18 of any shape best suited for the work at hand. The orifice shown is a long narrow slot which will flatten the extruded rubber and deliver it suitable for use in a tread or other calender. If the orifice is round it would produce the rubber suitable to be put directly into a tubing machine.

The housing is movably held down on the bed by gibs 19, and projecting downwardly from the front end of the housing is a bracket 20. Extending through this bracket is a threaded spindle 21. The inner end of the spindle passes through a nut 22 held between lugs 23 formed on the upper face of the bed below the housing. Near the outer end the spindle has a collar 24 that is located between the bracket 20 that projects downwardly from the housing and cap plate 25. By turning this spindle the casing may be adjusted longitudinally, and the space or kneading chamber between the conical tip at the end of the shaft and the inner wall of the head, may be decreased or enlarged to regulate its capacity, and consequently the amount of material that may be formed thereinto. By this means also the amount of heat which will be generated in the material may be determined.

With the machine described a continuous output of warmed rubber, in the required plastic condition for further use, may be produced with the expenditure of a relatively small amount of power.

While I have shown and described one form of the invention, it will be understood that various changes may be made therein without departing from the spirit of the invention. It will also be understood that the invention may be used for other purposes than that herein set forth.

What I claim is:

1. A machine for manipulating plastic materials comprising a rotatable shaft, a worm rotatable with the shaft for breaking up, feeding forward and masticating the material delivered thereto, a housing surrounding the worm and having an opening to the interior near the receiving end of the worm, a head attached to the housing and containing a conical kneading chamber, the taper of which extends inwardly, said chamber having a fluted wall in continuation of the housing chamber at the delivery end of the worm, and an orificed die attached to said head.

2. A machine for manipulating plastic materials comprising a rotatable shaft, bearings supporting the shaft against longitudinal movement, a worm rotatable with the shaft for breaking up, feeding forward and masticating the material delivered thereto, said worm being held against longitudinal movement, a housing surrounding the worm and adjustable longitudinally with relation thereto, said housing having an opening to the interior near the receiving end of the worm, means for adjusting the housing longitudinally of the shaft, a head attached to and adjustable with the housing and containing a conical kneading chamber in continuation of the housing chamber at the delivery end of the worm, the worm and chamber having kneading surfaces, and an orificed die attached to said head.

3. A machine for manipulating plastic materials comprising a rotatable shaft, a worm rotatable with the shaft for breaking up, feeding forward and masticating the material delivered thereto, a conical tip having a fluted surface attached to the shaft at the delivery end of the worm, a housing surrounding the worm and having an opening to the interior near the receiving end of the worm, a head attached to the housing and containing a kneading chamber with a fluted wall about said conical tip, and an orificed die attached to said head.

4. A machine for manipulating plastic materials comprising a rotatable shaft, a worm rotatable with the shaft for breaking up, feeding forward and masticating the material delivered thereto, a conical tip with a fluted kneading surface attached to the shaft at the delivery end of the worm, a housing surrounding the worm and having an opening to the interior near the receiving end of the worm, a head attached to the housing and surrounding said tip and forming a conical kneading chamber in continuation of the housing chamber at the delivery end of the worm, and an orificed die attached to said head.

5. A machine for manipulating plastic materials comprising a rotatable shaft, a worm rotatable with the shaft for breaking up, feeding forward and masticating the material delivered thereto, a conical tip attached to the shaft at the delivery end of the worm, a housing surrounding the worm and having an opening to the interior near the receiving end of the worm, a head attached to the housing and containing a tapering kneading chamber about said tip, the inner wall of said chamber being fluted and inclining at a greater angle to the axis than the tip, and an orificed die attached to said head.

6. A machine for manipulating plastic materials comprising a rotatable shaft, a conical fluted tip attached to the end of the shaft, a worm rotatable with the shaft for breaking up, feeding forward and masticating the material delivered thereto, the thread of said worm decreasing in pitch and volumetric capacity from the receiving end of the delivery end, a housing surrounding the worm and having an opening to the interior near the receiving end of the worm, a head with a fluted interior wall attached to the housing and surrounding said tip, and an orificed die attached to said head.

7. A machine for manipulating plastic materials comprising a rotatable shaft having a gear at one end and a conical tip at the other end, a worm rotatable with the shaft for breaking up, feeding forward and masticating the material delivered thereto, a housing having an opening to the interior near the receiving end of the worm, said housing having a cylindrical kneading chamber surrounding the worm and a conical collecting cavity surrounding the shaft tip, and an orificed die attached to said housing, said cavity having a fluted wall and decreasing in diameter and volumetric capacity toward said die.

8. A machine for manipulating plastic materials comprising a rotatable worm for breaking up, feeding forward and masticating the material delivered thereto, a housing surrounding said worm, said housing shaped to provide a feed opening near the receiving end of the worm, a head portion surrounding the worm at the forward end, the forward end of the worm and the interior of the head portion being reduced to form a substantial taper and being formed with projecting surfaces to knead the material, and the head having an outlet through which the material is discharged.

9. A machine for manipulating plastic materials comprising a rotatable worm for breaking up, feeding forward and masticating the material delivered thereto, a housing surrounding said worm, said housing shaped to provide a feed opening near the receiving end of the worm, a head portion surrounding the worm at the forward end, the forward end of the worm and the interior of the head being conical in form with their tapers extending inwardly and the opposing conical surfaces being shaped to knead the material, and the head having an outlet through which the material is discharged.

10. A machine for manipulating plastic materials comprising a rotatable worm for breaking up, feeding forward and masticating the material delivered thereto, a housing surrounding said worm, said housing shaped to provide a feed opening near the receiving end of the worm, a head portion surrounding the worm at the forward end, the forward end of the worm and the interior of the head portion being shaped to knead the material, and the head having an outlet through which the material is discharged, and means for adjusting the relative positions of the head and forward end of the worm to bring the kneading surfaces closer together or further apart, and maintaining the same non-resiliently in their adjusted positions.

11. A machine for manipulating plastic materials comprising a rotatable worm for breaking up, feeding forward and masticating the material delivered thereto, a housing surrounding said worm, said housing shaped to provide a feed opening near the receiving end of the worm, a head portion surrounding the worm at the forward end, the forward end of the worm and the interior of the head portion being reduced to form a substantial taper and being formed with projecting surfaces to knead the material, and the head having an outlet through which the material is discharged, and means for shaping the material passing through said outlet.

12. A machine for manipulating plastic materials comprising a rotatable shaft, a worm rotatable with the shaft for breaking up, feeding forward and masticating the material delivered thereto, said shaft having at its delivery end a conical tip formed with fluted kneading surfaces, a housing surrounding the worm and shaped to provide a feed opening, the housing having a head portion surrounding said tip and forming a conical kneading chamber in continuation of the housing chamber at the delivery end of the worm.

13. A machine for manipulating plastic materials comprising a rotatable shaft, a worm rotatable with the shaft for breaking up, feeding forward and masticating the material delivered thereto, said shaft having at its delivery end a conical tip formed with fluted kneading surfaces, a housing surrounding the worm and shaped to provide a feed opening, the housing having a head portion surrounding said tip and forming a conical kneading chamber in continuation of the housing chamber at the delivery end of the worm, and said conical kneading chamber being formed with fluted kneading surfaces opposing those on the tip.

14. A machine for manipulating plastic materials comprising a rotatable shaft having a worm thereon for breaking up, feeding forward and masticating the material delivered thereto, a housing surrounding the worm, the housing having a head portion and containing an inwardly tapering conical kneading chamber in continuation of the housing chamber at the delivery end of the worm, the worm and chamber taving kneading surfaces, and means for fixing the worm and housing so as to prevent enlargement of the conical kneading chamber during operation.

15. A machine for manipulating plastic materials comprising a rotatable shaft having a worm thereon for breaking up, feeding forward and masticating the material delivered thereto, a housing surrounding the worm, the housing having a head portion and containing a conical kneading chamber in continuation of the housing chamber at the delivery end of the worm, the worm and chamber having kneading surfaces, and means for fixing the worm and housing so as to prevent enlargement of the conical kneading chamber during operation, said means being adjustable.

In witness whereof, I have hereunto signed my name.

WILLIAM A. GORDON.